(No Model.)

E. BAUSCH.
BINOCULAR MICROSCOPE.

No. 293,217.        Patented Feb. 12, 1884.

WITNESSES:
Gustave Dieterich
Fred Huetwohl

INVENTOR
Edward Bausch.
By Geo. M. Hopkins.
ATTORNEY

UNITED STATES PATENT OFFICE.

EDWARD BAUSCH, OF ROCHESTER, NEW YORK.

BINOCULAR MICROSCOPE.

SPECIFICATION forming part of Letters Patent No. 293,217, dated February 12, 1884.

Application filed December 22, 1883. (No model.)

*To all whom it may concern:*

Be it known that I, EDWARD BAUSCH, a citizen of the United States, residing in Rochester, in the county of Monroe and State of New York, have invented a new and useful Improvement in Binocular Microscopes; and I do hereby declare that the following is a full, clear, and exact description thereof, reference being had to the accompanying drawings, forming a part of this specification.

My invention relates to the class of microscopes in which part of the rays of light emanating from the object and passing through the objective are divided by a doubly-reflecting prism, known as the "Wenham prism," so that one-half of the rays pass to an auxiliary eye-piece mounted in a branch tube applied to the side of the main tube.

In microscopes of this class the prism has heretofore been mounted in a box arranged to slide laterally in the lower part of the microscope-body, so that it could be moved into and out of its place by sliding the box, and any imperfection in the bearings of the box, which are necessarily narrow, allowed the box to move laterally, thereby impairing the effectiveness of the instrument. Another serious objection to the common method of mounting the prism is, that the size of tubes in microscopes being limited, and the box being contained entirely in the tube or nose-piece, the movement of the box and size of the prism are correspondingly limited. This being the case, a large proportion of the rays which are transmitted by modern objectives are prevented from passing to the eye-piece, so that it has frequently been found necessary to remove the nose-piece containing the ordinary prism-box and replace it by another nose-piece which had no obstruction when the full effectiveness of the objective was desired.

My invention is designed to obviate these difficulties by providing a prism-holder with a long cylindrical bearing, which is readily made and practically indestructible by wear, and which admits of either binocular or monocular arrangement of the microscope with the full effect of either method of vision.

It consists of a prism-carrying arm fixed to the end of a spindle extending through a sleeve passing through the side of the microscope-body, the spindle being provided with a milled head, by which it is turned, and with a stop-pin, for limiting its motion.

Figure 1:
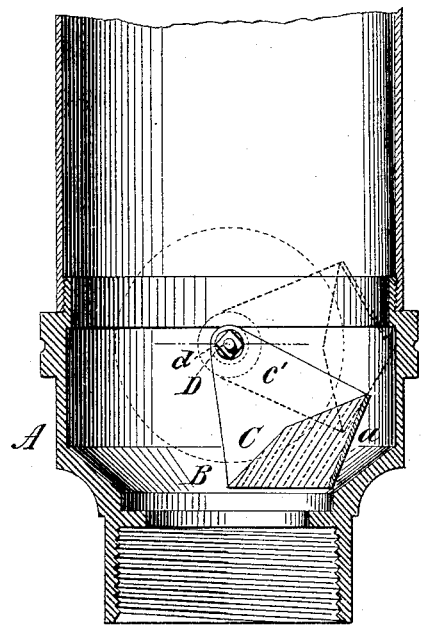
Figure 2:
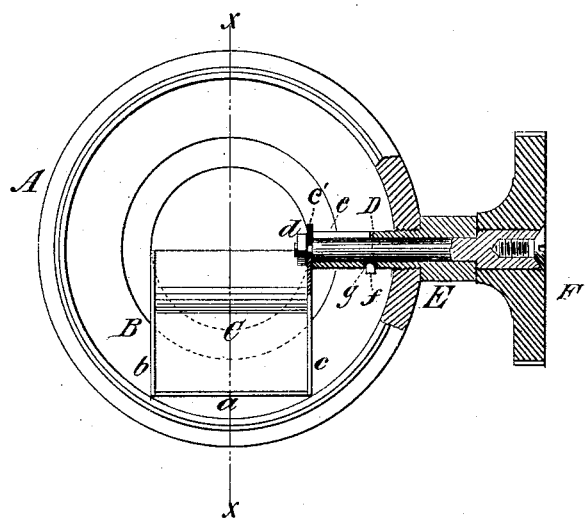

In the drawings, Figure 1 is a vertical section on line $x\ x$ in Fig. 2 of a portion of a microscope-body, showing my improvement applied. Fig. 2 is a plan view, partly in section.

Like letters of reference indicate the same parts in the two figures.

The body of the microscope is provided with a nose-piece, A, threaded in the usual way at its lower end to receive an objective, and having sufficient depth to contain the prism-holder B. The prism-holder B consists of a metallic plate, $a$, bent twice at right angles, and receiving between its parallel sides $b\ c$ the prism C. The side $c$ of the holder B is prolonged, forming an arm, $c'$, which is secured in any suitable manner to the end of a spindle, D. In the present case it is fitted to a shoulder on the spindle and fastened by means of a small nut, $d$, fitted to the threaded end of the spindle. The spindle D is fitted to a sleeve, E, passing through the side of the nose-piece A, so that it may turn therein without lateral or longitudinal motion. To insure the perfect bearing of the spindle D in the sleeve E the sleeve has a longitudinal slit, $e$, which permits it to adapt itself to the spindle by springing and to create the small amount of friction necessary to retain the prism-holder in any position. The outer end of the spindle D is provided with a milled head, F, by which the prism may be moved into or out of the field, and a pin, $f$, projecting from the spindle through a slot, $g$, in the sleeve E, limits the motion of the prism-holder in either direction. The prism-holder B is arranged relative to the main and auxiliary tubes of the microscope, so that it will swing in a plane lying in the axes of the two tubes, and when it is swung down into the position shown in full lines in the drawings the prism intercepts one-half of the rays passing through the objective and diverts them to the auxiliary tube. When the microscope is used for monocular vision, the prism is turned out of the field, as indicated by dotted lines in Fig. 1.

Having thus described my invention, what I claim as new, and desire to secure by Letters Patent, is—

1. In a binocular microscope, a swinging prism-holder adapted to support the prism within the body of the microscope either in or out of the field of vision, as herein specified.

2. The combination, with the doubly-reflecting prism of a binocular microscope, of a prism-supporting arm and spindle attached thereto, and extending outward through the microscope-body, as described.

3. The combination, in a binocular microscope, of the prism C, prism-holder B, spindle D, provided with the stop-pin $f$, and the slotted sleeve E, as herein specified.

EDWARD BAUSCH.

Witnesses:
CARL F. LOMB,
HENRY BAUSCH.